United States Patent
Choi et al.

(10) Patent No.: US 11,539,075 B2
(45) Date of Patent: Dec. 27, 2022

(54) ELECTROLYTE FOR LITHIUM SECONDARY BATTERY, AND LITHIUM SECONDARY BATTERY COMPRISING SAME

(71) Applicant: Samsung SDI Co., Ltd., Yongin-si (KR)

(72) Inventors: Hyunbong Choi, Yongin-si (KR); Pavel Shatunov, Yongin-si (KR); Olga Tsay, Yongin-si (KR); Aeran Kim, Yongin-si (KR); Woo Cheol Shin, Yongin-si (KR); Jeongmin Shin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 360 days.

(21) Appl. No.: 16/629,297

(22) PCT Filed: Apr. 5, 2018

(86) PCT No.: PCT/KR2018/004019
§ 371 (c)(1),
(2) Date: Jan. 7, 2020

(87) PCT Pub. No.: WO2019/017567
PCT Pub. Date: Jan. 24, 2019

(65) Prior Publication Data
US 2020/0153045 A1   May 14, 2020

(30) Foreign Application Priority Data
Jul. 21, 2017   (KR) .................... 10-2017-0092941

(51) Int. Cl.
*H01M 10/0567* (2010.01)
*C07F 9/06* (2006.01)
*H01M 10/0525* (2010.01)

(52) U.S. Cl.
CPC .......... *H01M 10/0567* (2013.01); *C07F 9/06* (2013.01); *H01M 10/0525* (2013.01); *H01M 2300/0025* (2013.01)

(58) Field of Classification Search
CPC ......... H01M 10/0567; H01M 10/0525; H01M 2300/0025; H01M 10/052;
(Continued)

(56) References Cited

U.S. PATENT DOCUMENTS

| | | |
|---|---|---|
| 2008/0153005 A1 | 6/2008 | Horikawa et al. |
| 2009/0291370 A1 | 11/2009 | Kim et al. |

(Continued)

FOREIGN PATENT DOCUMENTS

| | | |
|---|---|---|
| CN | 101057355 A | 10/2007 |
| CN | 102742064 A | 10/2012 |

(Continued)

OTHER PUBLICATIONS

Extended European Search Report for corresponding European Patent Application No. 18836015.0, dated Jun. 23, 2020, 7 pages.
(Continued)

*Primary Examiner* — Gary D Harris
(74) *Attorney, Agent, or Firm* — Lewis Roca Rothgerber Christie LLP

(57) ABSTRACT

Disclosed are an electrolyte for a lithium secondary battery and a lithium secondary battery comprising the same. The electrolyte for a lithium secondary battery, according to an embodiment, can comprise: a nonaqueous organic solvent; a lithium salt; a first additive comprising a compound represented by a specific chemical formula; and a second additive including at least one of lithium difluorophosphate ($LiPO_2F_2$), a cyclic carbonate including a fluorine atom, and a dinitrile compound.

17 Claims, 6 Drawing Sheets

(58) Field of Classification Search
CPC ......... H01M 10/0568; H01M 10/0569; H01M 10/4235; C07F 9/06; C07F 9/146; Y02E 60/10
USPC .......................................................... 429/200
See application file for complete search history.

(56) References Cited

U.S. PATENT DOCUMENTS

| | | | |
|---|---|---|---|
| 2012/0028132 | A1 | 2/2012 | Tsujioka et al. |
| 2012/0301795 | A1 | 11/2012 | Kaneko et al. |
| 2013/0177818 | A1 | 7/2013 | Han et al. |
| 2013/0266847 | A1 | 10/2013 | Noguchi et al. |
| 2014/0272604 | A1 | 9/2014 | Lim et al. |
| 2016/0013517 | A1 | 1/2016 | Nakazawa et al. |
| 2016/0056503 | A1* | 2/2016 | Shatunov .......... H01M 10/0567 429/188 |
| 2016/0197376 | A1 | 7/2016 | Koshiba et al. |
| 2018/0114651 | A1 | 4/2018 | Shimamoto et al. |
| 2018/0183100 | A1 | 6/2018 | Jeong et al. |
| 2018/0226678 | A1 | 8/2018 | Haruna et al. |
| 2018/0261885 | A1 | 9/2018 | Lee et al. |
| 2018/0301756 | A1 | 10/2018 | Sakaguchi et al. |
| 2019/0252724 | A1 | 8/2019 | Shatunov et al. |

FOREIGN PATENT DOCUMENTS

| | | |
|---|---|---|
| CN | 108140886 A | 6/2018 |
| CN | 109792085 A | 5/2019 |
| EP | 2 408 051 A1 | 1/2012 |
| EP | 3 522 287 A1 | 8/2019 |
| JP | 2010-257616 A | 11/2010 |
| JP | 2016-207633 A | 12/2016 |
| JP | 2017-117684 A | 6/2017 |
| KR | 10-2007-0098163 A | 10/2007 |
| KR | 10-2009-0120961 A | 11/2009 |
| KR | 10-2013-0082426 A | 7/2013 |
| KR | 10-2014-0104383 A | 8/2014 |
| KR | 10-2015-0022653 A | 3/2015 |
| KR | 10-2015-0032140 A | 3/2015 |
| KR | 10-2015-0078690 A | 7/2015 |
| KR | 10-2015-0089712 A | 8/2015 |
| KR | 10-2016-0002311 A | 1/2016 |
| KR | 10-2016-0024414 A | 3/2016 |
| KR | 10-2016-0050024 A | 5/2016 |
| KR | 10-2016-0063186 A | 6/2016 |
| KR | 10-2016-0078071 A | 7/2016 |
| KR | 10-2016-0150569 A | 12/2016 |
| KR | 10-2017-0009772 A | 1/2017 |
| KR | 10-2017-0028676 A | 3/2017 |
| KR | 10-2017-0058041 A | 5/2017 |
| KR | 10-2017-0063414 A | 6/2017 |
| KR | 10-2018-0036340 A | 4/2018 |
| WO | WO 2016/199823 A1 | 12/2016 |

OTHER PUBLICATIONS

Liu, Zhen, et al., "Cosolvent of fluoro-containing phosphazene for flame retardant electrolyte," Battery Bimonthly, vol. 46, No. 3, Jun. 30, 2016, pp. 125-128.
Park, Min-Sik, et al., "Incorporation of phosphorus into the surface of natural graphite anode of lithium ion batteries," Journal of Materials Chemistry, vol. 21, Oct. 2011, pp. 17960-17966.
Chinese Office Action, with English translation, dated Nov. 3, 2021, issued in corresponding Chinese Patent Application No. 201880048908.6 (14 pages).
Chinese Office Action dated Apr. 22, 2022 of the corresponding Chinese Application No. 201880048908.6, and corresponding English Translation, 9 pages.
European Office Action dated May 9, 2022 of the corresponding European Application No. 18836015.0, 4 pages.
Chinese Intellectual Property Office notice of allowance dated Aug. 22, 2022 for corresponding Chinese Patent Application No. 201880048908.6, with English translation, and accompanying search report dated Aug. 11, 2022, 6 pages.

* cited by examiner

ELECTROLYTE FOR LITHIUM SECONDARY BATTERY, AND LITHIUM SECONDARY BATTERY COMPRISING SAME

CROSS-REFERENCE TO RELATED APPLICATION(S)

This application is a National Phase Patent Application of International Patent Application Number PCT/KR2018/004019, filed on Apr. 5, 2018, which claims priority of Korean Patent Application No. 10-2017-0092941, filed Jul. 21, 2017. The entire contents of both of which are incorporated herein by reference.

TECHNICAL FIELD

The present disclosure relates to an electrolyte for a lithium secondary battery and a lithium secondary battery including the same.

BACKGROUND ART

A portable information device such as a cell phone, a laptop, smart phone, and the like or an electric vehicle has used a lithium secondary battery having high energy density and easy portability as a driving power source.

In general, a lithium secondary battery is manufactured by using materials capable of reversibly intercalating and deintercalating lithium ions as a positive active material and a negative active material and filling an electrolyte between a positive electrode and a negative electrode.

Lithium-transition metal oxides are used as the positive active material of the lithium secondary battery, various types of carbon-based materials are used as the negative active material, and lithium salts dissolved in the non-aqueous organic solvent are used as an electrolyte.

In particular, a lithium secondary battery exhibits battery characteristics by complex reactions such as a positive electrode and an electrolyte, a negative electrode and an electrolyte, and the like, and thus, the use of a suitable electrolyte is one of important parameters for improving the performance of a lithium secondary battery.

DISCLOSURE

Technical Problem

An embodiment provides an electrolyte for a lithium secondary battery and a lithium secondary battery including the same, which shows improved oxidative decomposition characteristics even when a lithium secondary battery is driven at a high voltage and improved swelling characteristics and cycle-life characteristics when stored at a high temperature.

Technical Solution

An electrolyte for a lithium secondary battery according to an embodiment includes a non-aqueous organic solvent; a lithium salt; a first additive including compound represented by Chemical Formula 1; and a second additive including at least one of lithium difluorophosphate ($LiPO_2F_2$), a cyclic carbonate including a fluorine atom, and a dinitrile compound.

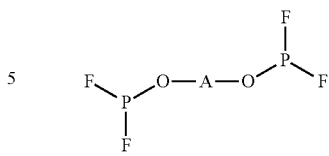

[Chemical Formula 1]

In Chemical Formula 1, A is a substituted or unsubstituted aliphatic chain or $(-C_2H_4-O-C_2H_4-)_n$, and n is an integer of 1 to 10.

A lithium secondary battery according to another embodiment may include a negative electrode, a positive electrode and the electrolyte for the lithium secondary battery according to the embodiment.

Advantageous Effects

According to embodiments, the electrolyte for the lithium secondary battery according to the present disclosure may implement an excellent lithium secondary battery having good oxidative decomposition characteristics during high voltage driving.

In addition, a lithium secondary battery having swelling characteristics and cycle-life characteristics even in a high temperature environment may be realized.

MODE FOR INVENTION

Figure 1:
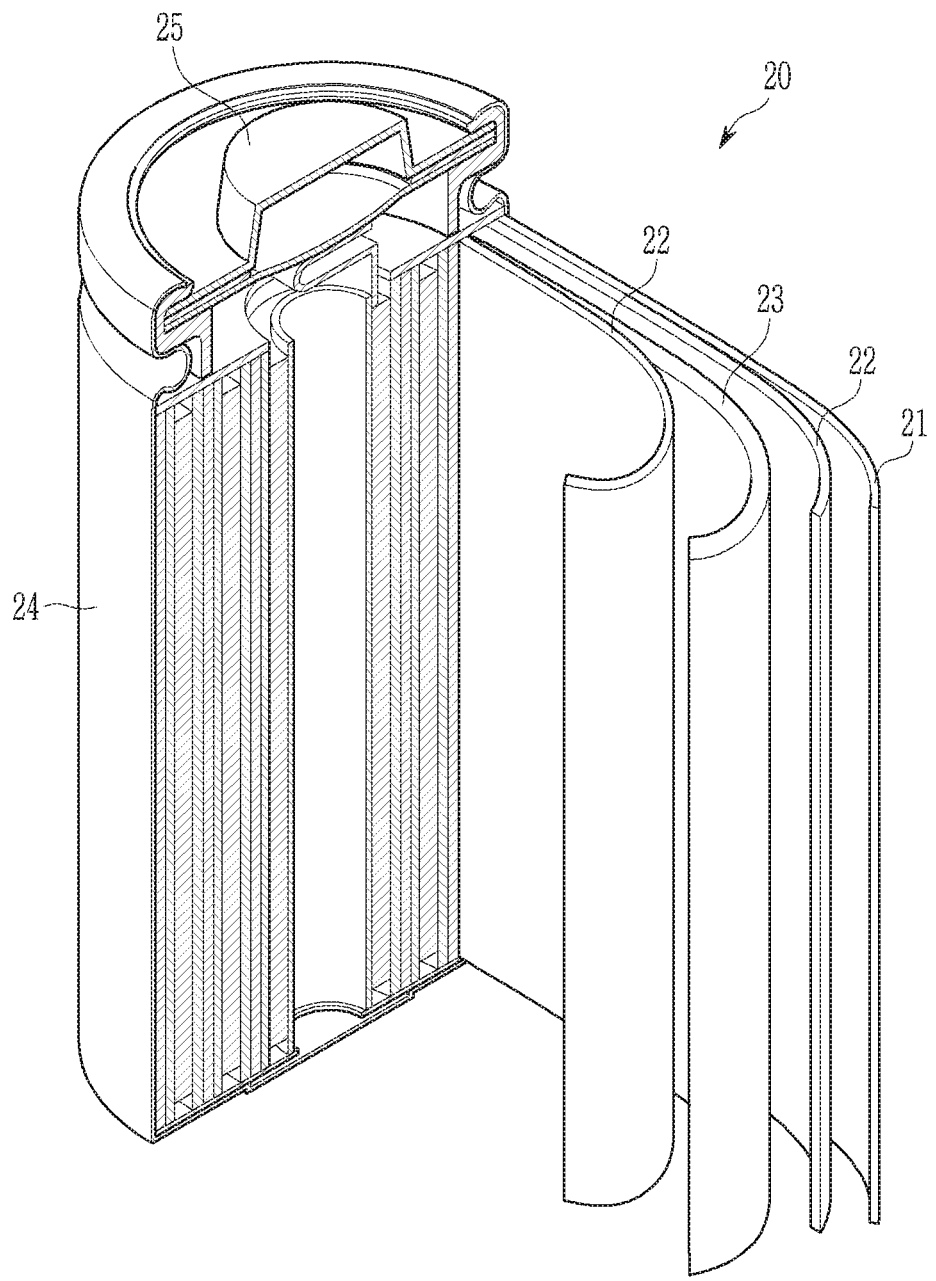
FIG. 1 illustrates a lithium secondary battery according to an embodiment of the present disclosure.

Hereinafter, various embodiments of the present invention will be described in detail with reference to the accompanying drawings so that those skilled in the art may easily carry out the present invention. However, the present invention may be embodied in many different forms and is not construed as limited to the example embodiments set forth herein.

In order to clearly illustrate the present invention, parts that are not related to the description are omitted, and the same or similar components are denoted by the same reference numerals throughout the specification.

The size and thickness of each constituent element as shown in the drawings are randomly indicated for better understanding and ease of description, and the present invention is not necessarily limited to as shown.

In addition, unless explicitly described to the contrary, the word "comprise" and variations such as "comprises" or "comprising," will be understood to imply the inclusion of stated elements but not the exclusion of any other elements.

The electrolyte for a lithium secondary battery according to an embodiment of the present disclosure may include a non-aqueous organic solvent, a lithium salt, a first additive including compound represented by Chemical Formula 1, and a second additive.

[Chemical Formula 1]

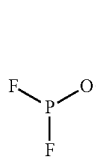

In Chemical Formula 1, A is a substituted or unsubstituted aliphatic chain or $(-C_2H_4-O-C_2H_4-)n$ and n is an integer of 1 to 10.

In Chemical Formula 1, A may be a C2 to C20 hydrocarbon chain or $(-C_2H_4-O-C_2H_4-)_n$ and n may be an integer of 1 to 5.

In addition, the compound represented by Chemical Formula 1 may be a compound represented by Chemical Formula 1-1.

[Chemical Formula 1-1]

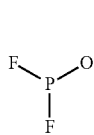

When applying the electrolyte including the additive including the compound represented by Chemical Formula 1 to a lithium secondary battery, cycle-life characteristics of the lithium secondary battery may be improved and gas generation at high temperatures may be greatly reduced.

This is because the compound represented by Chemical Formula 1 includes difluorophosphate ($-PF_2$) group having excellent electrical and chemical reactivity at both terminal ends.

During the initial charge of a lithium secondary battery, lithium ions from a lithium-transition metal oxide, which is a positive electrode, are transferred to a carbon electrode, which is a negative electrode, and are intercalated into carbon. Herein, lithium reacts with the carbon electrode due to its strong reactivity to produce $Li_2CO_3$, LiO, LiOH, and the like and to form a passivation film on the surface of the negative electrode. This passivation film is called a solid electrolyte interface (SEI) passivation film. The SEI passivation film formed during the initial charge prevents the reaction between lithium ions and the carbon negative electrode or other materials during charge and discharge. In addition, it also acts as an ion tunnel, allowing the passage of lithium ions. The ion tunnel prevents disintegration of the structure of the carbon negative electrode, which is caused by co-intercalation of organic solvents having a high molecular weight along with solvated lithium ions into the carbon negative electrode. Once the SEI passivation film is formed, lithium ions do not side-react again with the carbon electrode or other materials, such that the amount of lithium ions is reversibly maintained. Therefore, in order to improve the high-temperature cycle characteristics and the low-temperature power of the lithium secondary battery, a rigid SEI passivation film must be formed on the negative electrode of the lithium secondary battery.

However, when the additive including the compound represented by Chemical Formula 1 is included like the electrolyte for the lithium secondary battery according to the disclosure, a rigid SEI film having improved ion conductivity is formed on the surface of the negative electrode, and thereby it is possible to suppress a decomposition of the surface of the negative electrode during high temperature cycle operation and to prevent an oxidation reaction of the electrolyte solution.

The compound represented by Chemical Formula 1 may be decomposed to form a difluorophosphate ($-PF_2$) group and an alkylene dioxide fragment.

The difluorophosphate ($-PF_2$) group may form a donor-acceptor bond with transition metal oxide that is exposed on the surface of the positive active material due to excellent electrochemical reactivity and thus a protective layer in a form of a composite may be formed.

In addition, the difluorophosphate ($-PF_2$) adhered to the transition metal oxide at the initial charge of the lithium secondary battery may be oxidized to a plurality of fluorophosphates, and thus a passivation film which is a more stable inactive layer having excellent ion conductivity may be formed on a positive electrode. The inactive layer may prevent other components of the electrolyte from being oxidative-decomposed, and as a result, the cycle-life performance of the lithium secondary battery may be improved and a swelling phenomenon may be prevented from occurring.

Further, the compound represented by Chemical Formula 1 and its oxide participate in the electrochemical reaction with the components of a SEI passivation film to make the SEI passivation film more rigid and to improve stability of other components included in the electrolyte by oxidative decomposition.

In addition, the compound represented by Chemical Formula 1 forms a composite with $LiPF_6$ and thus undesirable side reactions may be prevented from occurring, and it is possible to improve cycle-life characteristics of the lithium secondary battery and to prevent the generation of gas in the lithium secondary battery, thereby greatly reducing an occurrence rate of defects due to a swelling phenomenon.

On the other hand, the first additive including the compound represented by Chemical Formula 1 may be included in an amount of 0.1 wt % to 2 wt % based on a total amount of the electrolyte for the lithium secondary battery. More specifically, the amount of the compound represented by Chemical Formula 1 may be 0.1 wt % to 1.5 wt %. When the amount of the first additive satisfies the ranges, a resistance increase may be prevented and thus a lithium secondary battery having improved high temperature storage characteristics may be realized.

The second additive may include at least one of for example, lithium difluorophosphate ($LiPO_2F_2$), a cyclic carbonate including a fluorine atom, and a dinitrile compound.

The second additive may be included in an amount of 0.1 wt % to 20 wt % based on a total amount of the electrolyte for the lithium secondary battery. In case that the amount of the second additive satisfies the range, a resistance increase that may occur in a high temperature storage environment may be effectively suppressed when the electrolyte for the lithium secondary battery according to the present disclosure is applied to a lithium secondary battery.

The amount ratio of the first additive and the second additive, in a weight ratio, may range from 0.1:1 to 1:1. In case that the amount ratio of the first additive and the second additive satisfies the range, gas generation may be effectively reduced even in a high temperature storage environment when the electrolyte for the lithium secondary battery according to the present disclosure is applied to a lithium secondary battery.

More specifically, the amount of the lithium difluorophosphate ($LiPO_2F_2$) may range from 0.1 wt % to 2 wt % based on a total weight of the electrolyte for the lithium secondary battery. More specifically, the amount of lithium difluorophosphate may be 0.5 wt % to 1.5 wt %. In case that the amount of lithium difluorophosphate satisfies the range, an effect of suppressing resistance increase is very excellent when the electrolyte for the lithium secondary battery according to the present disclosure is applied to a lithium secondary battery. In addition, since the gas generation may be significantly reduced even in a high temperature storage environment, swelling characteristics of a lithium secondary battery may be significantly improved.

The cyclic carbonate including a fluorine atom may be, for example, fluorinated ethylene carbonate (fluoroethylene carbonate, FEC). Herein, the amount of the cyclic carbonate including the fluorine atom may be 0.1 wt % to 20 wt % based on a total amount of the electrolyte for the lithium secondary battery. More specifically, the amount of the cyclic carbonate including the fluorine atom may be 1 wt % to 10 wt %. In case that the amount of the cyclic carbonate including the fluorine atom satisfies the range, the amount of gas generated may be greatly reduced even in a high temperature storage environment and swelling characteristics of the secondary battery may be significantly improved when the electrolyte for the lithium secondary battery according to the present disclosure is applied to a lithium secondary battery. In addition, when the additive is included as a second additive, the room temperature cycle-life improvement effect of the lithium secondary battery according to the present disclosure may be improved. In addition, the cyclic carbonate including the fluorine atom may improve stability in high temperature environment because it plays a role of forming a passivation film to control expansion of a negative electrode, when using negative active material including silicon (Si).

The dinitrile compound may be, for example, succinonitrile. The amount of the dinitrile compound may range from 0.1 wt % to 5 wt % based on a total amount of the electrolyte for the lithium secondary battery. More specifically, the amount of dinitrile compound may be 0.25 wt % to 2 wt %. When the amount of the dinitrile compound satisfies the range, it may increase a potential drop of the negative electrode. As such, the potential of the negative electrode is drastically reduced, thereby effectively suppressing elution of copper, which is a current collector component of the negative electrode, thus preventing the micro short circuit that may occur between the positive electrode and the negative electrode, and ensuring stability of the lithium secondary battery.

Meanwhile, the electrolyte for the lithium secondary battery according to an embodiment may further include a third additive including a sultone compound.

The sultone compound may be represented by Chemical Formula 2.

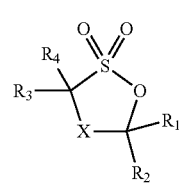

[Chemical Formula 2]

In Chemical Formula 2, X is selected from a single bond, a substituted or unsubstituted C1 to C10 alkylene group, a substituted or unsubstituted C2 to C10 alkenediyl group, and $R_1$ to $R_4$ are independently a hydrogen atom, a C1 to C10 alkyl group, a C3 to C30 cycloalkyl group, a C1 to C10 alkoxy group, a halogen, a C1 to C10 haloalkyl group, a C6 to C30 aryl group, and a combination thereof.

The sultone compound may be, for example, propane sultone (PS) or 1-propene 1,3-sultone (PST).

The amount of the third additive may be 0.1 wt % to 5 wt % based on a total amount of the electrolyte for the lithium secondary battery. More specifically, the amount of the third additive may be 0.5 wt % to 2 wt %. In case that the amount of the third additive satisfies the range, a thickness increase rate in a high temperature storage environment may be greatly reduced, and thus swelling characteristics are greatly improved when the electrolyte for the lithium secondary battery according to the present disclosure is applied to a lithium secondary battery.

The electrolyte for a lithium secondary battery may further include a secondary additive. The auxiliary additive may be at least one selected from, for example, vinylethylene carbonate (VC), lithium tetrafluoroborate ($LiBF_4$), and hexane tricyanide (HTCN), but is not limited thereto.

Herein, the amount of the auxiliary additive may be 0.1 wt % to 20 wt % based on a total amount of the electrolyte for the lithium secondary battery. More specifically, the amount of the auxiliary additive may be 0.1 wt % to 15 wt %. When the amount of the auxiliary additive satisfies the range, the battery resistance may be suppressed more effectively and a lithium secondary battery having good cycle-life characteristics may be provided.

On the other hand, the non-aqueous organic solvent serves as a medium for transporting ions taking part in the electrochemical reaction of a battery.

Such a non-aqueous organic solvent may be, for example, a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like.

The ester-based solvent may include methyl acetate, ethyl acetate, n-propyl acetate, dimethylacetate, methyl propionate, ethyl propionate (EP), propyl propionate (PP), γ-butyrolactone, decanolide, valerolactone, mevalonolactone, caprolactone, and the like.

The ether-based solvent may include dibutyl ether, tetraglyme, diglyme, dimethoxyethane, 2-methyltetrahydrofuran, tetrahydrofuran, and the like, and the ketone-based solvent may be cyclohexanone, and the like.

The alcohol based solvent may include ethanol, isopropyl alcohol, and the like, and the aprotic solvent may include nitriles such as T-CN (wherein T is a C2 to C20 linear, branched, or cyclic hydrocarbon group, a double bond, an aromatic ring, or an ether bond), and the like, amides such as dimethyl formamide, and the like, dioxolanes such as 1,3-dioxolane, and the like, sulfolanes, and the like.

The non-aqueous organic solvent may be used alone or in a mixture. When the organic solvent is used in a mixture, the mixture ratio may be controlled in accordance with a desirable battery performance.

As a specific solvent combination, for example, ethylene carbonate (EC), propylene carbonate (PC), ethyl propionate (EP), and propyl propionate (PP) may be mixed and used. In such a mixed solvent, ethylene carbonate: propylene carbonate: ethylpropionate: propylpropionate may be mixed in a volume ratio of 5 to 25:5 to 25:25 to 30:35 to 45 based on a total volume of the mixed solvent.

The carbonate-based solvent is prepared by mixing a cyclic carbonate and a chain-type carbonate. In this case, when the cyclic carbonate and the chain-type carbonate are mixed together in a volume ratio of 1:1 to 1:9, performance of an electrolyte may be enhanced.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 3.

[Chemical Formula 3]

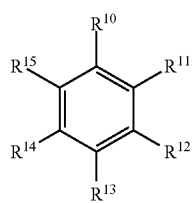

In Chemical Formula 3, $R^{10}$ to $R^{15}$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte for the lithium secondary battery may further include an ethylene carbonate-based compound of Chemical Formula 4 in order to improve battery cycle-life.

[Chemical Formula 4]

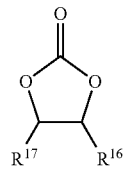

In Chemical Formula 4, $R^{16}$ and $R^{17}$ are independently selected from hydrogen, a halogen, a cyano group (CN), a nitro group ($NO_2$), a fluorinated C1 to C5 alkyl group, provided that at least one of $R^{16}$ and $R^{17}$ is selected from a halogen, a cyano group (CN), a nitro group ($NO_2$), and a fluorinated C1 to C5 alkyl group and $R^{16}$ and $R^{17}$ are not all hydrogen.

Examples of the ethylene carbonate-based compound may be difluoroethylenecarbonate, chloroethylene carbonate, dichloroethylene carbonate, bromoethylene carbonate, dibromoethylene carbonate, nitroethylene carbonate, cyanoethylene carbonate, or fluorinated ethylene carbonate. When the additive for improving the cycle-life is further used, its use amount may be adjusted appropriately.

The lithium salt dissolved in the organic solvent may act as a source of lithium ion in the battery, enabling a basic operation of a lithium secondary battery and promoting the movement of lithium ions between the positive and negative electrodes. Examples of the lithium salt include at least one supporting salt selected from $LiPF_6$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, where x and y are natural numbers, for example an integer of 1 to 20, LiCl, LiI, and $LiB(C_2O_4)_2$ (lithium bis(oxalato) borate: LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

Hereinafter, a lithium secondary battery according to another embodiment of the present disclosure is described.

FIG. 1 is a schematic view showing a structure of a lithium secondary battery according to an embodiment of this disclosure.

Referring to FIG. 1, a lithium secondary battery 20 according to an embodiment may include an electrode assembly, a case 24 configured to house the electrode assembly, and a sealing member 25 configured to seal the case 24.

The electrode assembly includes a positive electrode 23 including a positive active material, a negative electrode 21 including a negative active material, and a separator 22 disposed between the positive electrode 23 and the negative electrode 21. The positive electrode 23, the negative electrode 21, and the separator 22 may be impregnated in the electrolyte solution (not shown) of the present disclosure.

The positive electrode 23 includes a current collector and a positive active material layer disposed on the current collector and including a positive active material.

In the positive active material layer, the positive active material may include a compound (lithiated intercalation compound) being capable of intercalating and deintercallating lithium and specifically at least one composite oxide of lithium and a metal of cobalt, manganese, nickel, and a combination thereof may be used. Specific examples thereof may be a compound represented by one of chemical formulae. $Li_aA_{1-b}X_bD_2(0.90 \le a \le 1.8,\ 0 \le b \le 0.5)$; $Li_aA_{1-b}X_bO_{2-c}D_c$ $(0.90 \leq a \leq 1.8, 0 \leq b \leq 0.05, 0 \leq c \leq 0.05)$; $Li_aE_{1-b}X_bO_{2-c}D_c$ $(0.90 \leq a \leq 1.8, 0 \leq b \leq 0.5, 0 \leq c \leq 0.05)$; $Li_aE_{2-b}X_bO_{4-c}D_c$ $(0.90 \leq a \leq 1.8, 0 \leq b \leq 0.5, 0 \leq c \leq 0.05)$; $Li_aNi_{1-b-c}Co_bX_cD_a$ $(0.90 \leq a \leq 0 \leq b \leq 0.5, 0 \leq c \leq 0.5, 0 \leq a \leq 2)$; $Li_aNi_{1-b-c}Co_bX_cO_{2-aa}T_a$ $(0.90 \leq a \leq 1.8, 0 \leq b \leq 0.5, 0 \leq c \leq 0.05, 0 < a < 2)$; $Li_aNi_{1-b-c}Co_bX_cO_{2-a}T_2(0.90 \leq a \leq 1.8, 0 \leq b \leq 0.5, 0 \leq c \leq 0.05, 0 < a < 2)$; $Li_aNi_{1-b-c}Mn_bX_cD_a(0.90 \leq a \leq 1.8, 0 \leq b \leq 0.5, 0 \leq c \leq 0.05, 0 < a \leq 2)$; $Li_aNi_{1-b-c}Mn_bX_cO_{2-a}T_a$ $(0.90 \leq a \leq 0 \leq b \leq 0.5, 0 \leq c \leq 0.05, 0 < a < 2)$; $Li_aNi_{1-b-c}Mn_b X_cO_{2-a}T_2(0.90 \leq a 1.8, 0 \leq b \leq 0.5, 0 \leq c \leq 0.05, 0 < a < 2)$; $Li_aN-i_bE_cG_dO_2(0.90 \leq a \leq 1.8, 0 \leq b \leq 0.9, 0 \leq c \leq 0.5, 0.001 \leq d \leq 0.1)$; $Li_aNi_bCo_cMn_dG_eO_2(0.90 \leq a \leq 1.8, 0 \leq b \leq 0.9, 0 \leq c \leq 0.5, 0 \leq d \leq 0.5, 0.001 \leq e \leq 0.1)$; $Li_aNiG_bO_2(0.90 \leq a \leq 1.8, 0.001 \leq b \leq 0.1)$; $Li_aCoG_bO_2(0.90 \leq a \leq 1.8, 0.001 \leq b \leq 0.1)$; $Li_aMn_{1-b}G_bO_2(0.90 \leq a \leq 1.8, 0.001 \leq b \leq 0.1)$; $Li_aMn_2G_bO_4$ $(0.90 \leq a \leq 1.8, 0.001b \leq 0.1)$; $Li_aMn_{1-g}G_gPO_4(0.90 \leq a \leq 1.8, 0 \leq g \leq 0.5)$; $QO_2$; $QS_2$; $LiQS_2$; $V_2O_5$; $LiV_2O_5$; $LiZO_2$; $LiNiVO_4$; $Li_{(3-f)}J_2(PO_4)_3(0 \leq f \leq 2)$; $Li_{(3-f)}Fe_2(PO_4)_3(0 \leq f \leq 2)$; $Li_aFePO_4(0.90 \leq a \leq 1.8)$ In chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

Particularly, the positive active material of the present disclosure may desirably include cobalt. When the positive active material includes cobalt, the additive including the compound represented by Chemical Formula 1 included in the electrolyte may be adsorbed on the cobalt to form a passivation film thereon.

More specifically, the positive active material may include a lithium metal oxide represented by Chemical Formula 5.

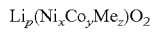

$Li_p(Ni_xCo_yMe_z)O_2$ [Chemical Formula 5]

In Chemical Formula 5, $0.9 \leq p \leq 1.1$, $0.5 = x \leq 0 < y \leq 0.3$, $0 < z \leq 0.3$, $x+y+z=1$, Me is at least one of Al, Mn, Mg, Ti, and Zr.

More specifically, in the metal oxide included in the positive active material of the present embodiment, that is, Chemical Formula 5, x may be in the range of $0.7 \leq x \leq 0.98$.

In addition, the lithium metal oxide may have a coating layer on the surface, or may be mixed with another lithium metal oxide having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method (e.g., spray coating, dipping, etc.), but is not illustrated in more detail since it is well-known to those skilled in the related field.

In an embodiment, a positive active material including two or more compounds represented by different chemical formulae may be, for example, applied to the positive electrode. In this case, when one of the two or more compounds is for example a compound represented by Chemical Formula 5, the compound represented by Chemical Formula 5 may be included in an amount of 30 wt % to 97 wt % based on a total amount of the positive active material.

In the positive electrode, the positive active material may be included in an amount of 90 wt % to 98 wt % based on a total weight of the positive active material layer.

In an embodiment, the positive active material layer may further include a binder and a conductive material. Herein, each amount of the binder and conductive material may be 1 wt % to 5 wt % based on a total weight of the positive active material layer.

The binder improves binding properties of positive active material particles with one another and with a current collector, and examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material is included to provide electrode conductivity and any electrically conductive material may be used as a conductive material unless it causes a chemical change. Examples of the conductive material may include a carbon-based material such as natural graphite, artificial graphite, carbon black, acetylene black, ketjen black, carbon fiber, and the like; a metal-based material of a metal powder or a metal fiber including copper, nickel, aluminum, silver, and the like; a conductive polymer such as a polyphenylene derivative; or a mixture thereof.

The current collector may be an aluminum foil, a nickel foil, or a combination thereof, but is not limited thereto.

The negative electrode 21 includes a current collector and a negative active material layer formed on the current collector and including a negative active material.

On the other hand, the negative active material may include a material that reversibly intercalates/deintercalates lithium ions, a lithium metal, a lithium metal alloy, a material capable of doping/dedoping lithium, or a transition metal oxide.

The material that reversibly intercalates/deintercalates lithium ions may include a carbon material that is a generally-used carbon-based negative active material in a lithium secondary battery. Examples of the carbon-based negative active material may be crystalline carbon, amorphous carbon, or a mixture thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be Si, $SiO_x(0<x<2)$, a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), a Si-carbon composite, Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, and not Sn), a Sn-carbon composite, and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

Specifically, the negative active material may be a silicon-carbon composite including, for example, crystalline carbon and silicon particles. In this case, the average diameter of the silicon particles included in the silicon-carbon composite may be in the range of 10 nm to 200 nm. In addition, at least one part of the silicon-carbon composite may include an amorphous carbon layer.

The negative active material may include at least two types of compounds. For example, the negative active material may include the silicon-carbon composite and crystalline carbon.

Herein, the negative active material including at least two types of compounds may be formed into one negative active material layer or a plurality of negative active material layers.

The plurality of negative active material layers may include for example a first negative active material layer including a first negative active material and a second negative active material layer formed on the first negative active material layer and including a second negative active material that is different from the first negative active material. Specifically, the first negative active material may include, for example, a silicon-carbon composite, but the second negative active material may include crystalline carbon.

The transition metal oxide includes a lithium titanium oxide.

The negative active material layer includes a negative active material, a binder and optionally, a conductive material.

In the negative active material layer, the negative active material may be included in an amount of 95 wt % to 99 wt % based on a total weight of the negative active material layer.

When the negative active material layer includes a negative active material including silicon, the silicon may be included in a range of 3 wt % to 50 wt % based on a total weight of the negative active material layer.

In the negative active material layer, an amount of the binder may be 1 wt % to 5 wt % based on a total weight of the negative active material layer. When the conductive material is further included, 90 wt % to 98 wt % of the negative active material, 1 wt % to 5 wt % of the binder, and 1 wt % to 5 wt % of the conductive material may be used.

The binder acts to adhere negative active material particles to each other and to adhere the negative active material to the current collector. The binder may use a non-aqueous binder, an aqueous binder, or a combination thereof.

The non-aqueous binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The aqueous binder may be a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth) acrylic acid alkyl ester, or a combination thereof.

When the negative electrode binder is an aqueous binder, a cellulose-based compound may be further used to provide viscosity as a thickener. The cellulose-based compound includes one or more of carboxylmethyl cellulose, hydroxypropylmethyl cellulose, methyl cellulose, or alkali metal salts thereof. The alkali metals may be Na, K, or Li. The thickener may be included in an amount of 0.1 to 3 parts by weight based on 100 parts by weight of the negative active material.

The conductive material is included to provide electrode conductivity and any electrically conductive material may be used as a conductive material unless it causes a chemical change. Examples of the conductive material include a carbon-based material such as natural graphite, artificial graphite, carbon black, acetylene black, ketjen black, denka black, a carbon fiber, and the like; a metal-based material of a metal powder or a metal fiber including copper, nickel, aluminum silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The positive active material layer and the negative active material layer are formed by mixing an active material, a binder and optionally a conductive material in a solvent to prepare an active material composition, and coating the active material composition on a current collector. The electrode formation method is well known, and thus is not described in detail in the present specification. The solvent includes N-methylpyrrolidone and the like, but is not limited thereto. When the aqueous binder is used in the negative active material layer, a solvent used for preparing the negative active material composition may be water.

The separator 22 may include polyethylene, polypropylene, polyvinylidene fluoride, or a multi-layer thereof and may be a mixed multilayer such as a polyethylene/polypropylene double-layered separator, a polyethylene/polypropylene/polyethylene triple-layered separator, a polypropylene/polyethylene/polypropylene triple-layered separator, and the like.

EXAMPLES

Hereinafter, the disclosure will be described in detail with reference to the following Examples.

Example 1

(1) Manufacture of Positive and Negative Electrodes 97.3 wt % of a positive active material including a compound including lithium, nickel, cobalt, and aluminum, 1.4 wt % of polyvinylidene fluoride as a binder, and 1.3 wt % of ketjen black as a conductive material were mixed and then, dispersed in N-methylpyrrolidone to prepare positive active material slurry. The positive active material slurry was coated on an aluminum foil and dried to manufacture a positive electrode.

98 wt % of graphite as a negative active material, 1 wt % of polyvinylidene fluoride as a binder, and 1 wt % of ketjen black as a conductive material were mixed and then, dispersed in N-methylpyrrolidone to prepare a negative active material layer composition, and the negative active material layer composition was coated on a copper foil and then, dried and compressed to manufacture a negative electrode.

(2) Preparation of Electrolyte 1.5 M LiPF$_6$ was added to a mixed solvent of ethylene carbonate (EC), ethyl methyl carbonate (EMC), and dimethyl carbonate (DMC) (a volume ratio of 20:10:70) to prepare a first mixed solution.

Based on 100 wt % of the first mixed solution, 0.5 wt % of a compound represented by Chemical Formula 1-1 and 1 wt % of lithium difluorophosphate were added thereto to prepare an electrolyte for a lithium secondary battery.

[Chemical Formula 1-1]

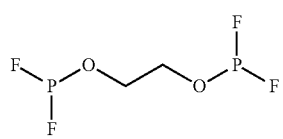

(3) Manufacture of Lithium Secondary Battery Cell

A 18650 coin-type full cell was manufactured in a common method by using the positive and negative electrodes according to the (1) and the electrolyte prepared according to the (2).

Example 2

(1) Manufacture of Positive and Negative Electrodes

A positive electrode and a negative electrode were manufactured in the same manner as in Example 1.

(2) Preparation of Electrolyte 1.5 M LiPF$_6$ was added to a mixed solvent of ethylene carbonate (EC), ethyl methyl carbonate (EMC), and dimethyl carbonate (DMC) (20:10:70 of a volume ratio) to prepare a first mixed solution.

Based on 100 wt % of the first mixed solution, 1 wt % of the compound represented by Chemical Formula 1-1 and 10 wt % of fluorinated ethylene carbonate were added thereto to prepare an electrolyte for a lithium secondary battery.

[Chemical Formula 1-1]

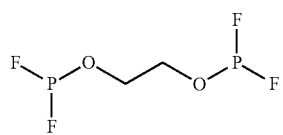

(3) Manufacture of Lithium Secondary Battery Cell

An 18650 circular full cell was manufactured in the same manner as in Example 1.

Example 3

(1) Manufacture of Positive Electrode and Negative Electrode

A positive electrode and a negative electrode were manufactured in the same manner as in Example 1.

(2) Preparation of Electrolyte 1.5 M LiPF$_6$ was added to a mixed solvent of ethylene carbonate (EC), ethyl methyl carbonate (EMC), and dimethyl carbonate (DMC) (20:10:70 of a volume ratio) to prepare a first mixed solution.

Based on 100 wt % of the first mixed solution, 1 wt % of the compound represented by Chemical Formula 1-1 and 1 wt % of succinonitrile were added thereto to prepare an electrolyte for a lithium secondary battery.

[Chemical Formula 1-1]

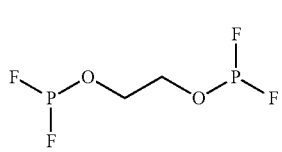

(3) Manufacture of Lithium Secondary Battery Cell

An 18650 circular full cell was prepared in the same manner as in Example 1.

Example 4

(1) Manufacture of Positive Electrode and Negative Electrode

A positive electrode and a negative electrode were manufactured in the same manner as in Example 1.

(2) Preparation of Electrolyte

A second mixed solution was prepared by adding 1.15 M LiPF$_6$ to a mixed solvent of ethylene carbonate (EC), propylene carbonate (PC), ethyl propionate (EP), and propyl propionate (PP) (20:10:40:30 of a volume ratio).

Based on 100 wt % of the second mixed solution, 7 wt % of fluorinated ethylene carbonate (FEC), 1 wt % of vinylethylene carbonate (VC), 0.2 wt % of lithium tetrafluoroborate (LiBF$_4$), 3 wt % of succinonitrile (SN), 2 wt % of hexane tricyanide (HTCN), 1 wt % of the compound represented by Chemical Formula 1-1, and 0.5 wt % of propane sultone (PS) were added thereto to prepare an electrolyte for a lithium secondary battery.

[Chemical Formula 1-1]

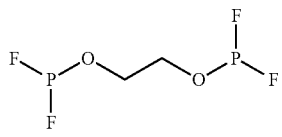

(3) Manufacture of Lithium Secondary Battery Cell

The positive and negative electrodes according to the (1) and the electrolyte according to the (2) were used in a common method to manufacture a 524687-sized polymer cell.

Example 5

(1) Manufacture of Positive Electrode and Negative Electrode

A positive electrode and a negative electrode were manufactured in the same manner as in Example 1.

(2) Preparation of Electrolyte

A second mixed solution was prepared by adding 1.15 M LiPF$_6$ to a mixed solvent of ethylene carbonate (EC), propylene carbonate (PC), ethyl propionate (EP), and propyl propionate (PP) (20:10:40:30 of a volume ratio).

Based on 100 wt % of the second mixed solution, 7 wt % of fluorinated ethylene carbonate (FEC), 1 wt % of vinylethylene carbonate (VC), 0.2 wt % of lithium tetrafluoroborate (LiBF$_4$), 3 wt % of succinonitrile (SN), 2 wt % of hexane tricyanide (HTCN), 1 wt % of the compound represented by Chemical Formula 1-1, and 1 wt % of propane sultone (PS) were added thereto to prepare an electrolyte for a lithium secondary battery.

[Chemical Formula 1-1]

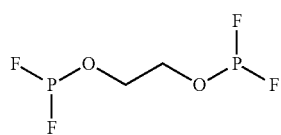

(3) Manufacture of Lithium Secondary Battery Cell

The positive and negative electrodes according to the (1) and the electrolyte according to the (2) were used in a common method to manufacture a 524687-sized polymer cell.

Comparative Example 1

(1) Manufacture of Positive Electrode and Negative Electrode

A positive electrode and a negative electrode were manufactured in the same manner as in Example 1.

(2) Preparation of Electrolyte 1.5 M LiPF$_6$ was added to a mixed solvent of ethylene carbonate (EC), ethyl methyl carbonate (EMC), and dimethyl carbonate (DMC) (20:10:70 of a volume ratio) to prepare a first mixed solution.

(3) Manufacture of Lithium Secondary Battery Cell

An 18650 circular full cell was prepared in the same manner as in Example 1.

Comparative Example 2

(1) Manufacture of Positive Electrode and Negative Electrode

A positive electrode and a negative electrode were manufactured in the same manner as in Example 1.

(2) Preparation of Electrolyte 1.5 M LiPF$_6$ was added to a mixed solvent of ethylene carbonate (EC), ethyl methyl carbonate (EMC), and dimethyl carbonate (DMC) (20:10:70 of a volume ratio) to prepare a first mixed solution.

An electrolyte for a lithium secondary battery was prepared according to the same method as Example 1 except that 0.5 wt % of the compound represented by Chemical Formula 1-1 was used based on 100 wt % of the first mixed solution.

[Chemical Formula 1-1]

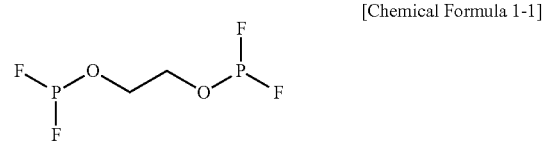

(3) Manufacture of Lithium Secondary Battery Cell

An 18650 circular full cell was prepared in the same manner as in Example 1.

Comparative Example 3

(1) Manufacture of Positive Electrode and Negative Electrode

A positive electrode and a negative electrode were manufactured in the same manner as in Example 1.

(2) Preparation of Electrolyte 1.5 M LiPF$_6$ was added to a mixed solvent of ethylene carbonate (EC), ethyl methyl carbonate (EMC), and dimethyl carbonate (DMC) (20:10:70 of a volume ratio) to prepare a first mixed solution.

An electrolyte for a lithium secondary battery was prepared according to the same method as Example 1 except that 1.5 wt % of lithium difluorophosphate was used based on 100 wt % of the first mixed solution.

(3) Manufacture of Lithium Secondary Battery Cell

An 18650 circular full cell was prepared in the same manner as in Example 1.

Comparative Example 4

(1) Manufacture of Positives and Negative Electrodes

A positive electrode and a negative electrode were manufactured in the same manner as in Example 1.

(2) Preparation of Electrolyte 1.5 M LiPF$_6$ was added to a mixed solvent of ethylene carbonate (EC), ethyl methyl carbonate (EMC), and dimethyl carbonate (DMC) (20:10:70 of a volume ratio) to prepare a first mixed solution.

An electrolyte for a lithium secondary battery was prepared according to the same method as Example 1 except that 10 wt % of fluorinated ethylene carbonate was used based on 100 wt % of the first mixed solution.

(3) Manufacture of Lithium Secondary Battery Cell

An 18650 circular full cell was prepared in the same manner as in Example 1.

Comparative Example 5

(1) Manufacture of Positive Electrode and Negative Electrode

A positive electrode and a negative electrode were manufactured in the same manner as in Example 1.

(2) Preparation of Electrolyte 1.5 M LiPF$_6$ was added to a mixed solvent of ethylene carbonate (EC), ethyl methyl carbonate (EMC), and dimethyl carbonate (DMC) (20:10:70 of a volume ratio) to prepare a first mixed solution.

An electrolyte for a lithium secondary battery was prepared according to the same method as Example 1 except that 1 wt % of the compound represented by Chemical Formula 1-1 was used based on 100 wt % of the first mixed solution.

[Chemical Formula 1-1]

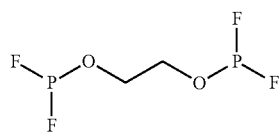

(3) Manufacture of Lithium Secondary Battery Cell

An 18650 circular full cell was prepared in the same manner as in Example 1.

Comparative Example 6

(1) Manufacture of Positive Electrode and Negative Electrode

A positive electrode and a negative electrode were manufactured in the same manner as in Example 1.

(2) Preparation of Electrolyte 1.5 M LiPF$_6$ was added to a mixed solvent of ethylene carbonate (EC), ethyl methyl carbonate (EMC), and dimethyl carbonate (DMC) (20:10:70 of a volume ratio) to prepare a first mixed solution.

An electrolyte for a lithium secondary battery was prepared according to the same method as Example 1 except that 1 wt % of succinonitrile was used based on 100 wt % of the first mixed solution.

(3) Manufacture of Lithium Secondary Battery Cell

An 18650 circular full cell was prepared in the same manner as in Example 1.

Comparative Example 7

(1) Manufacture of Positive and Negative Electrodes

A positive electrode and a negative electrode were manufactured in the same manner as in Example 1.

(2) Preparation of Electrolyte

A second mixed solution was prepared by adding 1.15 M LiPF$_6$ to a mixed solvent of ethylene carbonate (EC), propylene carbonate (PC), ethyl propionate (EP), and propyl propionate (PP) (20:10:40:30 of a volume ratio).

Based on 100 wt % of the second mixed solution, 7 wt % of fluorinated ethylene carbonate (FEC), 1 wt % of vinylethylene carbonate (VC), 0.2 wt % of lithium tetrafluoroborate (LiBF$_4$), 3 wt % of succinonitrile (SN), and 2 wt % of hexane tricyanide (HTCN) were added thereto to prepare an electrolyte for a lithium secondary battery.

(3) Manufacture of Lithium Secondary Battery Cell

A 524687 sized polymer cell was prepared in the same manner as in Example 4.

Reference Example 1

(1) Manufacture of Positive Electrode and Negative Electrode

A positive electrode and a negative electrode were manufactured in the same manner as in Example 1.

(2) Preparation of Electrolyte

A second mixed solution was prepared by adding 1.15 M LiPF$_6$ to a mixed solvent of ethylene carbonate (EC), propylene carbonate (PC), ethyl propionate (EP), and propyl propionate (PP) (20:10:40:30 of a volume ratio).

An electrolyte for a lithium secondary battery was prepared by using 7 wt % of fluorinated ethylene carbonate (FEC), 1 wt % of vinylethylene carbonate (VC), 0.2 wt % of lithium tetrafluoroborate (LiBF$_4$), 3 wt % of succinonitrile (SN), 2 wt % of hexane tricyanide (HTCN), and 1 wt % of the compound represented by Chemical Formula 1-1 based on 100 wt % of the second mixed solution.

[Chemical Formula 1-1]

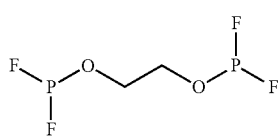

(3) Manufacture of Lithium Secondary Battery Cell

A 524687-sized polymer cell was prepared in the same manner as in Example 4.

Experimental Example 1: Resistance Increase Rate

DC resistance (DC-IR) of the lithium secondary battery cells according to Example 1 and Comparative Examples 1 and 2 was obtained in the following method.

The lithium secondary battery cells were charged to a voltage of SOC (a state of charge) 50% (a state of being charged to 50% of charge capacity based on 100% of the total charge capacity) at 0.5 C of a current at the 1st cycle, and DC voltages thereof were measured in the following method.

① The cells were cut off at 0.02 C and then, paused for 10 minutes.

② Subsequently, the cells were constant current-discharged at 0.5 C for 30 seconds, paused for 30 seconds, constant current-charged at 0.5 C for 30 second, and paused for 10 minutes.

③ Then, the cells were constant current-discharged at 1.0 C for 30 seconds, paused for 30 seconds, constant current-charged at 0.5 C for 1 minute, and paused for 10 minutes.

④ Next, the cells were constant current-discharged at 2.0 C for 30 seconds, paused for 30 seconds, constant current-charged at 0.5 C for 2 minutes, and paused for for 10 minutes.

⑤ Subsequently, the cells were constant current-discharged at 3.0 C for 30 seconds, paused for 30 seconds, constant current-charged at 0.5 C for 2 minutes, and paused for 10 minutes.

Herein, an average voltage drop for 30 seconds at each C-rate is a DC voltage (measured by calculating V=IR).

Subsequently, the cells were stored at a high temperature of 60° C. for 30 days and measured with respect to DC resistance (DC-IR), and then, the results and resistance increase rates calculated therefrom are shown in Table 1.

TABLE 1

|  | Initial DC resistance (unit: mohm) | DC resistance after 30 days of high temperature storage (unit: mohm) | Resistance increase rate (%) |
| --- | --- | --- | --- |
| Example 1 | 19.19 | 23.31 | 121 |
| Comparative Example 1 | 19.3 | 28.95 | 150 |
| Comparative Example 2 | 18.88 | 24.68 | 131 |
| Comparative Example 3 | 18.84 | 25.81 | 137 |

Referring to Table 1, the lithium secondary battery cell of Example 1 using an electrolyte including both of the first and second additives exhibited a greatly deteriorated resistance increase rate from at least 10% to at most greater than or equal to 30% after stored at a high temperature, compared with Comparative Example 1 using an electrolyte including no first and second additives, Comparative Example 2 using an electrolyte including the first additive alone, and Comparative Example 3 using an electrolyte including the second additive alone.

Experimental Example 2: Storage Characteristics at High Temperature (1) Evaluation of Capacity Retention and Capacity Recovery after High Temperature (60° C.) Storage Initial discharge capacity of the lithium ion battery cells measured regarding the initial DC resistance in Experimental Example 1 was measured. Next, in order to examine capacity deterioration after allowed to stand at a high temperature, the cell allowed to stand at a high temperature of 60° C. for 30 days was discharged at 0.2 C to 3.0 V under a constant current condition at room temperature (25° C.) and then, measured with respect to discharge capacity. And, capacity retentions were calculated according to the following equation, and the results are shown in Table 2.

Capacity retention[%]=[discharge capacity after storage at 60° C. for 30 days/initial discharge capacity before high temperature storage]×100

Subsequently, in order to evaluate capacity recovery, the cells examined with respect to the discharge capacity were recharged at 0.2 C to 4.3 V under a constant current condition and under a constant voltage condition of using a cut-off current of 0.05 C and discharged under a constant current condition at 0.2 C to 3.0 V and then, measured with respect to discharge capacity. And, the capacity recovery was calculated according to the following equation, and the results are shown in Table 2.

Capacity recovery[%]=[discharge capacity of recharged cell after high temperature storage/initial discharge capacity before high temperature storage]×100

TABLE 2

|  | Before high temperature storage | After high temperature storage | |
| --- | --- | --- | --- |
|  | Initial discharge capacity (mAh/g) | Capacity retention (%) | Capacity recovery (%) |
| Example 1 | 3105.4 | 88.21 | 95.2 |
| Comparative Example 1 | 3097.1 | 86.21 | 94.12 |
| Comparative Example 2 | 3092.8 | 86.77 | 94.32 |
| Comparative Example 3 | 3074.4 | 86.81 | 94.42 |

Referring to Table 2, the lithium secondary battery cell of Example 1 using an electrolyte including the first and second additives exhibited excellent capacity retention and capacity recovery in a high temperature environment compared with the lithium secondary battery cell of Comparative Example 1 using an electrolyte including no first and second additives, the lithium secondary battery cell of Comparative Example 2 using an electrolyte including the first additive alone, and the lithium secondary battery cell of Comparative Example 3 using an electrolyte including the second additive alone.

(2) Evaluation of Capacity Retention and Capacity Recovery after High temperature (60° C.) Storage The lithium secondary battery cells of Example 3 and Comparative Examples 5 and 6 were stored at a high temperature of 60° C. respectively for 7 days and 21 days and then, evaluated with respect to capacity retention and capacity recovery according to the same method as the (1).

TABLE 3

|  | After storage at 60° C. for 7 days | | After storage at 0° C. for 21 days | |
| --- | --- | --- | --- | --- |
|  | Capacity retention (%) | Capacity recovery (%) | Capacity retention (%) | Capacity recovery (%) |
| Example 3 | 94.5 | 90.9 | 85.12 | 60.24 |
| Comparative Example 6 | 93.4 | 90.9 | 80.14 | 57.81 |
| Comparative Example 5 | 93.2 | 90.5 | 84.13 | 56.05 |

Referring to Table 3, the lithium secondary battery cell of Example 3 using an electrolyte including a dinitrile compound as the first and second additives was compared with the cell of Comparative Example 5 using an electrolyte including the first additive alone and the cell of Comparative Example 6 using the electrolyte including the second additive alone as follows.

The cells of Example 3 and Comparative Examples 5 and 6 exhibited no large difference in terms of capacity retention and capacity recovery after the storage at a high temperature for 7 days, but the cell of Example 3 exhibited very high capacity retention and capacity recovery after allowed to stand at a high temperature for 21 days compared with the cells of Comparative Examples 5 and 6.

(3) Evaluation of Capacity Retention and Capacity Recovery after High temperature (85° C.) Storage The lithium secondary battery cells of Example 3 and Comparative Examples 5 and 6 were measured with respect to DC resistance, a resistance increase rate, capacity retention, and capacity recovery in the same method as the experiment (1) except that they were stored at 85° C. for 8 hours. The results are shown in Table 4.

TABLE 4

| | After storage at 85° C. for 8 hours | | | | |
|---|---|---|---|---|---|
| | Initial DC-IR (0 hrs) (mΩ) | DC-IR (8 hrs) (mΩ) | Resistance increase rate DCIR (Ratio) (%) | Capacity recovery (%) | Capacity retention (%) |
| Example 3 | 1.386 | 2.201 | 158.8 | 91.4 | 94.8 |
| Comparative Example 6 | 1.351 | 2.360 | 174.7 | 90.9 | 93.4 |
| Comparative Example 5 | 1.421 | 2.345 | 165.0 | 89.0 | 91.4 |

Referring to Table 4, when the lithium secondary battery cell of Example 3 was compared with the lithium secondary battery cells of Comparative Examples 5 and 6, very excellent capacity retention, capacity recovery, and a resistance increase rate after stored under a severe condition, that is, at a high temperature of 85° C. for 8 hours.

Experimental Example 3: Evaluation of Room Temperature Cycle-life

The lithium secondary battery cells of Example 1 and Comparative Examples 2 and 3 were charged under a constant current-constant voltage condition at 1 C and 4.45 V under a cut-off condition of 0.05 C and discharged under a constant current at 1.0 C and 3.0 V at room temperature (25° C.), which was 500 times performed, and then, discharge capacity thereof was measured. A capacity retention of discharge capacity at each cycle relative to discharge capacity at the first cycle was calculated, and the results are shown in FIG. 2.

In addition, the lithium secondary battery cells according to Example 2 and Comparative Examples 1, 4, and 5 were charged under a constant current-constant voltage condition at 1 C and 4.45 V under a cut-off condition of 0.05 C and discharged under a constant current condition at 1.0 C and 3.0 V discharge condition at room temperature (25° C.), which was 100 times performed, and then, discharge capacity thereof was measured. A capacity retention of discharge capacity at each cycle relative to discharge capacity at the first cycle was calculated, and the results are shown in FIG. 3.

Figure 2:
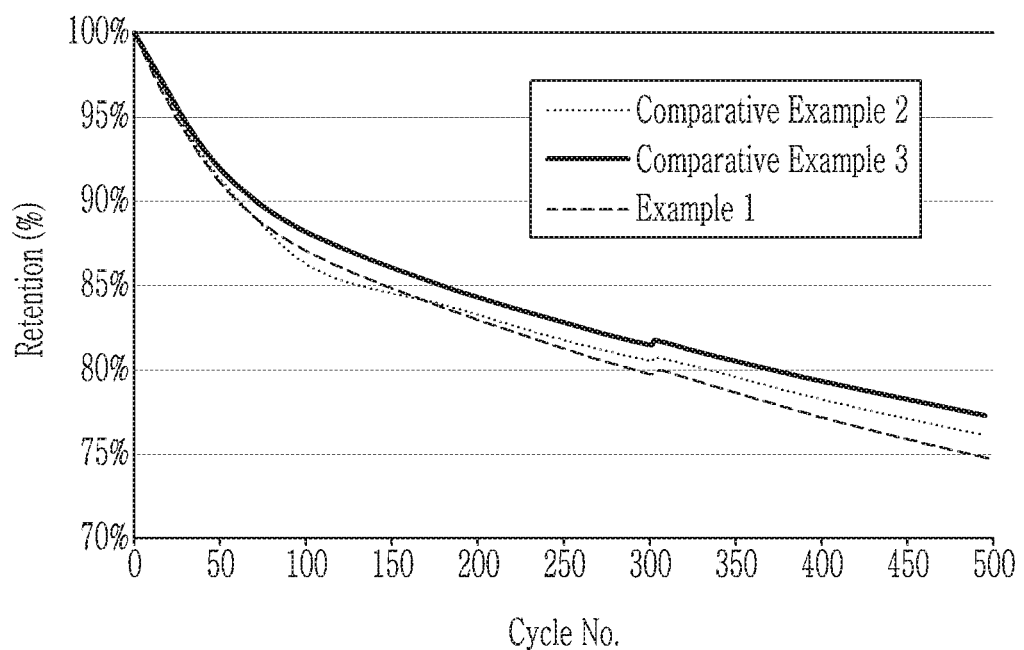
FIG. 2 shows room temperature cycle-life evaluation results for the lithium secondary battery cells manufactured according to Example 1 and Comparative Examples 2 and 3.

Referring to FIG. 2, the lithium secondary battery cell of Example 1 using a mixture of the first and second additives exhibited a similar cycle-life to those of the lithium secondary battery cells of Comparative Example 2 and 3 using the first additive or the second additive alone and thus no cycle-life characteristic deterioration.

Figure 3:
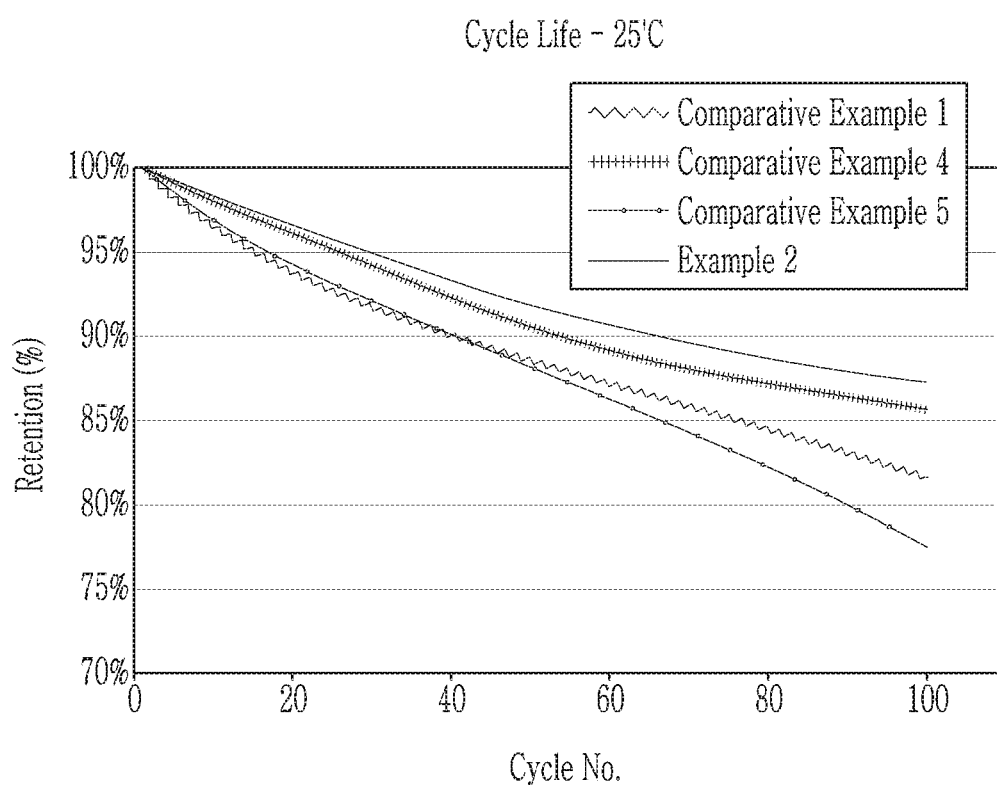
FIG. 3 shows room temperature cycle-life evaluation results for the lithium secondary battery cells manufactured according to Example 2 and Comparative Example 1, 4, and 5.

In addition, referring to FIG. 3, the lithium secondary battery cell of Example 2 exhibited very improved cycle-life characteristics compared at room temperature compared with the lithium secondary battery cells of Comparative Examples 1, 4, and 5.

Experimental Example 4: Evaluation of Gas Generation after High Temperature Storage The lithium secondary battery cells of Example 1 and Comparative Examples 2 and 3 after stored at 60° C. for 30 days were measured with respect to a gas generation amount (ml) by using a refinery gas analyzer (RGA). The results are shown in Table 5.

TABLE 5

| | Gas generation amount after 30 days' storage (mL) |
|---|---|
| Example 1 | 14.3 |
| Comparative Example 2 | 16.2 |
| Comparative Example 3 | 17.1 |

Referring to Table 5, the lithium secondary battery cell of Example 1 using an electrolyte including the first and second additives exhibited a greatly small gas generation amount after stored at a high temperature, compared with the lithium secondary battery cells of Comparative Examples 2 and 3 using an electrolyte including either the first additive or the second additive. Accordingly, when an electrolyte according to Examples of the present invention was applied, swelling characteristics of the lithium secondary battery cells were improved.

Experimental Example 5: Evaluation of Gas Generation and $CO_2$ Generation Amount after High Temperature Storage The lithium secondary battery cells according to Comparative Examples 1, 4, and 5 and Example 2 were measured with respect to a gas generation amount (ml) and a $CO_2$ gas generation amount (ml) out of the gas generation amount (ml) after stored at 60° C. for 30 days by using a Refinery Gas Analyzer (RGA). The results are shown in Table 6.

TABLE 6

| | Formation process | | After storage for 30 days | |
|---|---|---|---|---|
| | Gas generation amount (mL) | $CO_2$ gas generation amount (mL) | Gas generation amount (mL) | $CO_2$ gas generation amount (mL) |
| Example 2 | 0.73 | 0.03 | 2.71 | 0.85 |
| Comparative Example 1 | 4.27 | — | 5.51 | — |
| Comparative Example 4 | 0.97 | 0.45 | 5.04 | 2.47 |
| Comparative Example 5 | 3.38 | — | 4.03 | — |

Referring to Table 6, the lithium secondary battery cell of Example 2 using an electrolyte including the first and second additives exhibited a greatly low gas generation amount after the formation process and the 30 days' storage compared with the lithium secondary battery cell of Comparative Example 1 using an electrolyte using no first and second additives.

In addition, the lithium secondary battery cell of Comparative Example 4 using an electrolyte including the second additive alone exhibited greatly high gas generation amounts in the formation process and after the 30 days' storage compared with the lithium secondary battery cell of Example 2. In addition, when the lithium secondary battery cells of Example 2 and Comparative Example 4 were compared with respect to a $CO_2$ generation amount, an electrolyte including the first and second additives exhibited an excellent gas generation-reducing effect, even though the second additive was included in a small amount.

On the other hand, the lithium secondary battery cell of Comparative Example 5 using an electrolyte including the first additive alone exhibited a similar gas generation amount in the formation process to that of the lithium secondary battery cell of Example 2 but almost twice higher gas generation amount after the 30 days' storage than that of the lithium secondary battery cell of Example 2 and thus very deteriorated swelling characteristics.

Experimental Example 6: Evaluation of Impedance

Figure 4:
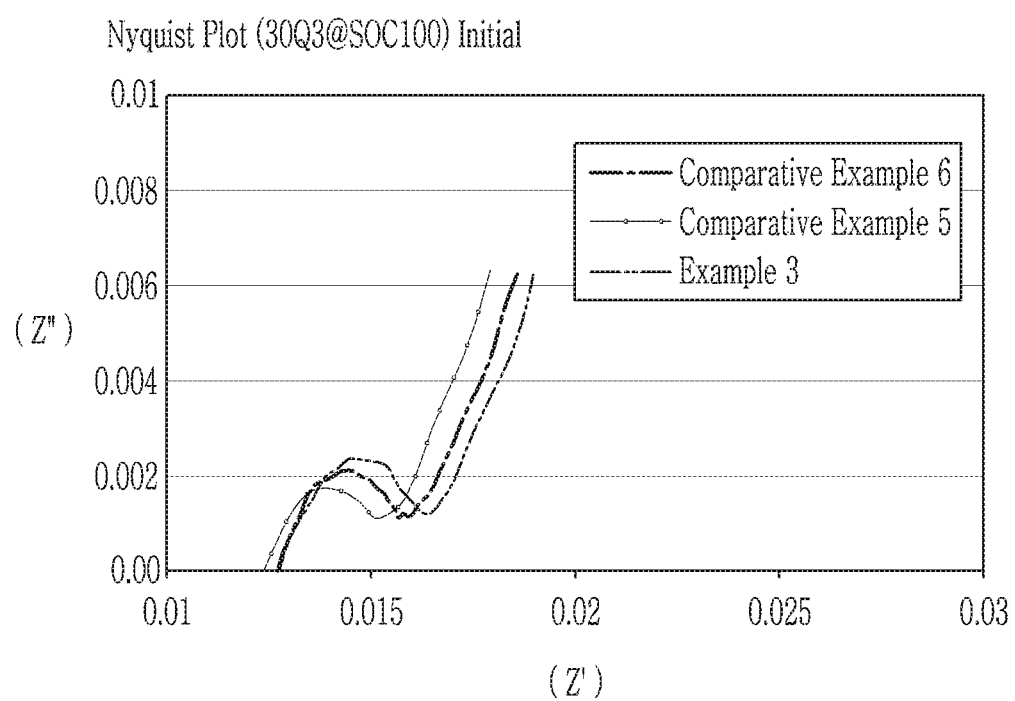
FIG. 4 shows initial impedance measurement results for the lithium secondary battery cells manufactured according to Example 3 and Comparative Examples 5 and 6.

The lithium secondary battery cells of Example 3 and Comparative Examples 5 and 6 were charged to 4.4 V at 0.5 C up to SOC (State of Charge) 100% (a full charge, a state of charging a battery to 100% of charge capacity based on 100% of the total charge capacity of the battery during the charge and discharge in a range of 2.75 V to 4.4 V) and then, measured with respect to impedance, and the results are shown in FIG. 4.

Figure 5:
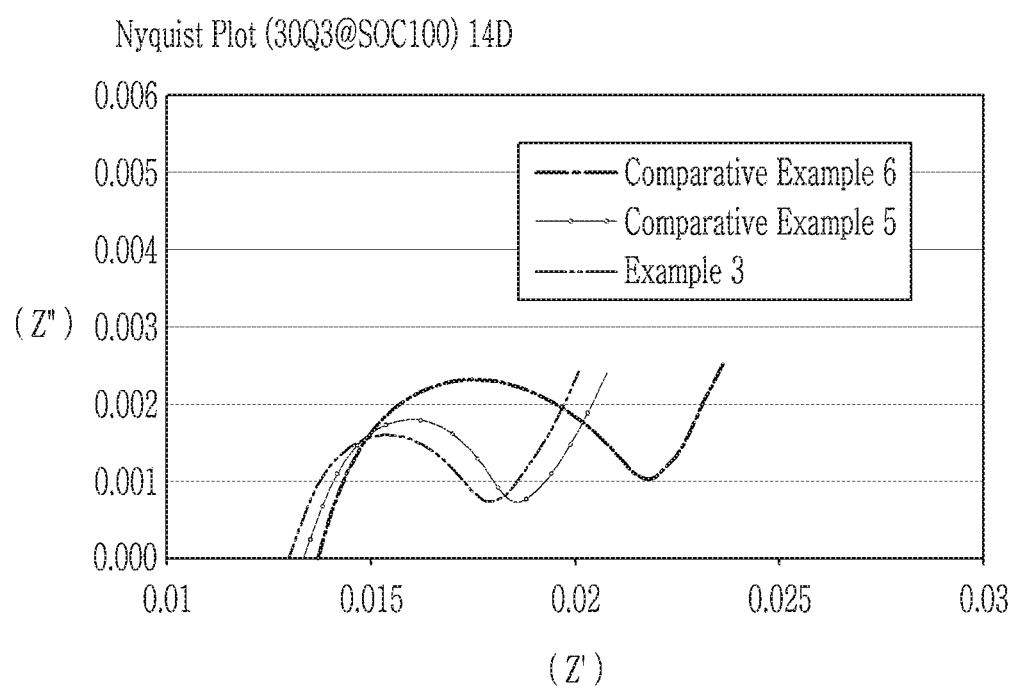
FIG. 5 shows impedance measurement results after high temperature storage for lithium secondary battery cells manufactured according to Example 3 and Comparative Examples 5 and 6.

Subsequently, impedance of the cells was respectively measured after stored at 60° C. for 14 days, and the results are shown in FIG. 5.

Herein, the impedance was measured by using PARSTAT 2273 in a 2-probe method, wherein a frequency was in a range of 1 K to 1 Hz. Nyquist plots obtained in the impedance measurements were respectively shown in FIGS. 4 and 5. In FIGS. 4 and 5, Z' indicates resistance, and Z" indicates reactance.

Referring to FIG. 4, before the high temperature storage, the impedances of Example 3 and Comparative Examples 5 and 6 exhibited almost no charge movement resistance difference, but referring to FIG. 5, after the high temperature storage, the impedances of Comparative Examples 5 and 6 were greatly lower than that of Example 3.

Experimental Example 7: Evaluation of High Temperature Cycle-life (45° C.)

The lithium secondary battery cells of Example 3 and Comparative Examples 5 and 6 were charged under a constant current-constant voltage at 1 C and 4.45 V under a 0.05 C cut-off condition and discharged under a constant current at 1.0 C and 3.0 V at a high-temperature of 45° C., which was 160 times repeated, and then, discharge capacity thereof was measured. A capacity retention of discharge capacity at each cycle relative to discharge capacity at the first cycle was calculated, and the results are shown in FIG. 6.

Figure 6:
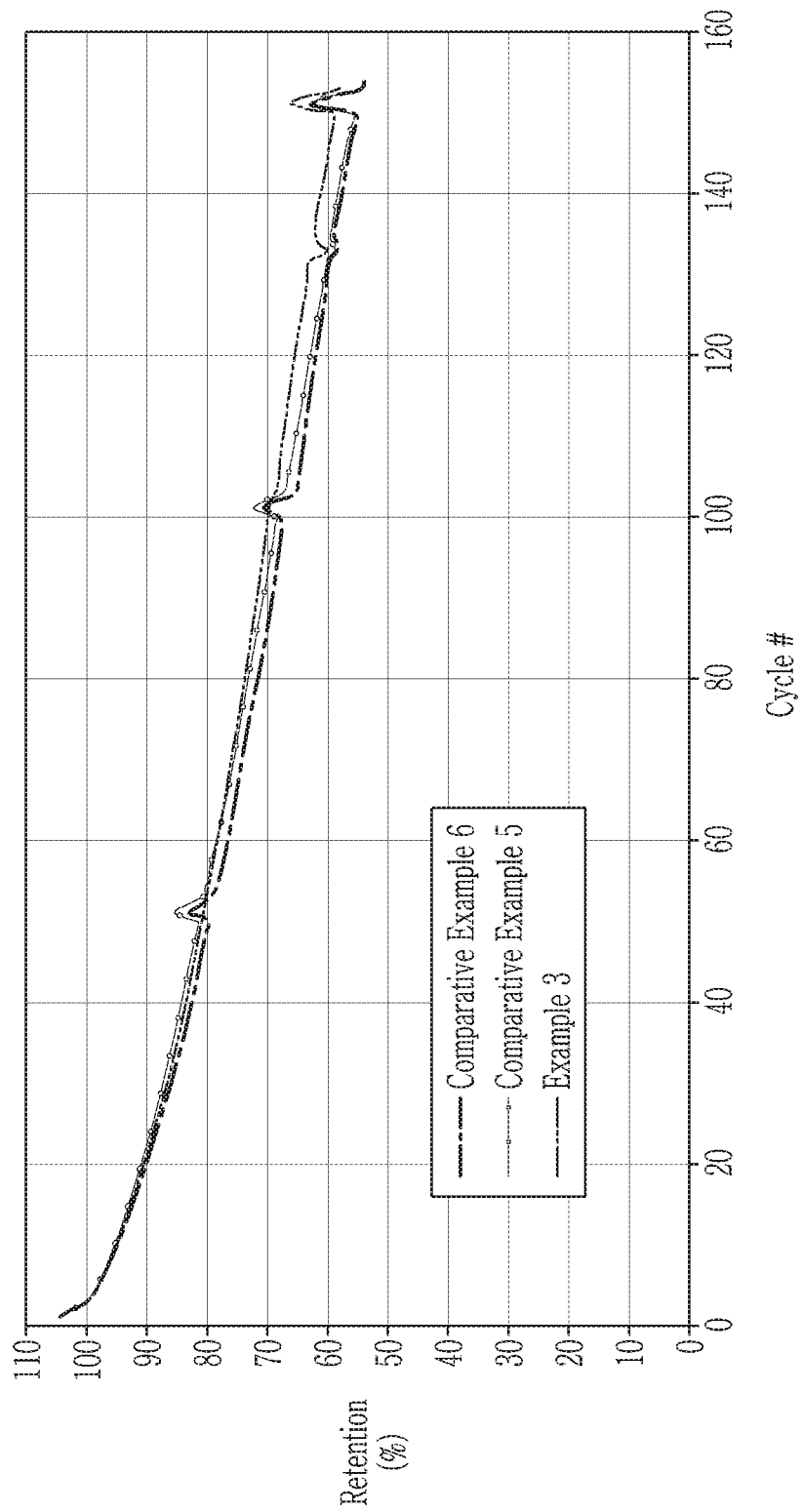
FIG. 6 shows high temperature cycle-life evaluation results for the lithium secondary battery cells manufactured according to Example 3 and Comparative Example 5 and 6.

Referring to FIG. 6, the lithium secondary battery cell of Example 3 using the first and second additives and Comparative Examples 5 and 6 using the first or second additive exhibited a similar cycle-life at a high temperature, and accordingly, the lithium secondary battery cells using an electrolyte including the first and second additives exhibited no cycle-life characteristic deterioration.

Experimental Example 8: Measurement of Thickness Increase Rate

The lithium secondary battery cells of Examples 4 and 5, Reference Example 1, and Comparative Example 7 were charged at 0.5 C up to SOC (State of Charge) 100% (a full charge, a state of being charged to 100% of charge capacity based on 100% of the total charge capacity of a battery during the charge and discharge in a range of 2.75 V to 4.4 V) and then, stored at 60° C. for 35 days. After measuring initial battery thicknesses before the storage, battery thicknesses after the storage were measured, and then, battery thickness increase rates were calculated therefrom, and the results are shown in Table 7.

TABLE 7

|  | Initial thickness (mm) | Thickness after 35 days (mm) | Thickness increase rate (%) |
| --- | --- | --- | --- |
| Comparative Example 7 | 4.89 | 5.98 | 22.3 |
| Reference Example 1 | 4.91 | 5392 | 20.8 |
| Example 4 | 4.91 | 5.51 | 12.3 |
| Example 5 | 4.91 | 5.25 | 6.9 |

Referring to Table 7, the lithium secondary battery cells of Examples 4 and 5 using an electrolyte including the first and second additives exhibited a greatly deteriorated thickness increase rate after stored at a high temperature compared with the lithium secondary battery cell of Comparative Example 7 using an electrolyte including an auxiliary additive but no first and second additives.

In addition, the lithium secondary battery cell of Reference Example 1 using an electrolyte including the first additive and the auxiliary additive but no second additive exhibited a greatly increased thickness increase rate compared with the lithium secondary battery cells of Examples 4 and 5.

Accordingly, when an electrolyte according to Examples of the present invention was applied, swelling characteristics may be improved by decreasing the thickness increase rates of the lithium secondary battery cells.

Experimental Example 9: Measurement of Ret/Rec after Storage at 65° C. for 35 Days The lithium secondary battery cells according to Examples 4 and 5, Reference Example 1, and Comparative Example 7 were charged at a current of 0.5 C up to a voltage of SOC (a state of charge) 50% (a state of being charged to 50% of charge capacity based on 100% of total battery charge capacity) at the first cycle, and then, initial discharge capacity thereof was measured.

Subsequently, in order to compare capacity deteriorations due to high temperature storage, the cells after allowed to stand at a high temperature (65° C.) for 35 days were discharged under a constant current condition at 0.2 C to 3.0 V at room temperature (25° C.), and discharge capacity (A2)

thereof was measured. And, capacity retentions were calculated according to the following equation, and the results are shown in Table 8.

Capacity retention[%]=discharge capacity after storage at 65° C. for 30 days (A2)/initial discharge capacity(A1))×100

Subsequently, in order to evaluate capacity recovery, the cells after measuring the discharge capacity were recharged at 0.2 C to 4.3 V under a constant current condition and cut off at a current of 0.05 C under a constant voltage condition and then, discharged at 0.2 C to 3.0 V under a constant current condition, and discharge capacity (A3) thereof was measured. And, capacity recovery was measured according to the following equation, and the results are shown in Table 8.

Capacity recovery[%]=[discharge capacity of recharged cell after high temperature storage (A3)/initial discharge capacity (A1)]×100

TABLE 8

| | Before high temperature storage Initial discharge capacity (A1) (mAh/g) | After high temperature storage | | | |
|---|---|---|---|---|---|
| | | Capacity retention | | Capacity recovery | |
| | | Discharge capacity (A2) (mAh/g) | Retention (%) | Discharge capacity (A3) (mAh/g) | Recovery (%) |
| Comparative Example 7 | 3711 | 3032 | 81.7 | 3429 | 92.4 |
| Reference Example 1 | 3705 | 3077 | 83.0 | 3466 | 93.5 |
| Example 4 | 3688 | 3144 | 85.2 | 3534 | 95.8 |
| Example 5 | 3686 | 3162 | 85.8 | 3565 | 96.7 |

Referring to Table 8, the lithium secondary battery cells of Examples 4 and 5 using an electrolyte including the first and second additives exhibited very excellent capacity retention and capacity recovery after stored at a high temperature compared with the lithium secondary battery cell of Comparative Example 7 using an electrolyte including the auxiliary additive alone but no first and second additives.

In addition, the lithium secondary battery cell of Reference Example 1 using an electrolyte including the first additive and the auxiliary additive but no second additive exhibited deteriorated capacity retention and capacity recovery compared with the lithium secondary battery cells of Examples 4 and 5.

Accordingly, when an electrolyte of Examples of the present invention was used, the lithium secondary battery cells exhibited excellent cycle-life characteristics in a high temperature environment.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

DESCRIPTION OF SYMBOLS

20: secondary battery
21: negative electrode
22: separator
23: positive electrode
25: sealing member

The invention claimed is:

1. An electrolyte for a lithium secondary battery comprising
a non-aqueous organic solvent;
a lithium salt;
a first additive including compound represented by Chemical Formula 1; and
a second additive comprising at least one of lithium difluorophosphate (LiPO$_2$F$_2$), a cyclic carbonate including a fluorine atom, and a dinitrile compound,

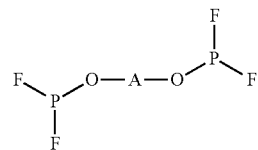

[Chemical Formula 1]

wherein, in Chemical Formula 1, A is a substituted or unsubstituted aliphatic chain or (—C$_2$H$_4$—O—C$_2$H$_4$—)n and n is an integer of 1 to 10.

2. The electrolyte of claim 1, wherein in Chemical Formula 1, A is a C2 to C20 hydrocarbon chain or (—C$_2$H$_4$—O—C$_2$H$_4$—)n and n is an integer of 1 to 5.

3. The electrolyte of claim 1, wherein the compound represented by Chemical Formula 1 is a compound represented by Chemical Formula 1-1:

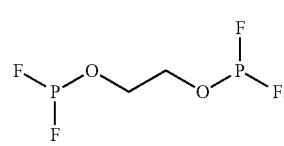

[Chemical Formula 1-1]

4. The electrolyte of claim 1, wherein the cyclic carbonate including the fluorine atom is fluorinated ethylene carbonate (FEC).

5. The electrolyte of claim 1, wherein the dinitrile compound is succinonitrile.

6. The electrolyte of claim 1, wherein an amount of the first additive is 0.1 wt % to 2 wt % based on a total amount of the electrolyte for the lithium secondary battery.

7. The electrolyte of claim 1, wherein an amount of the second additive is 0.1 wt % to 20 wt % based on a total amount of the electrolyte for the lithium secondary battery.

8. The electrolyte of claim 1, wherein an amount of the lithium difluorophosphate (LiPO$_2$F$_2$) is 0.1 wt % to 2 wt % based on a total amount of the electrolyte for the lithium secondary battery.

9. The electrolyte of claim 1, wherein an amount of the cyclic carbonate including the fluorine atom is 0.1 wt % to 20 wt % based on a total amount of the electrolyte for the lithium secondary battery.

10. The electrolyte of claim 1, wherein an amount of the dinitrile compound is 0.1 wt % to 5 wt % based on a total amount of the electrolyte for the lithium secondary battery.

11. The electrolyte of claim 1, wherein an amount ratio of the first additive and the second additive, in a weight ratio, ranges from 0.1:1 to 1:1.

12. The electrolyte of claim 1, wherein the electrolyte for the lithium secondary battery further comprises a third additive comprising a sultone compound.

13. The electrolyte of claim 12, wherein the sultone compound is represented by Chemical Formula 2:

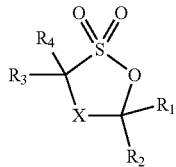

[Chemical Formula 2]

wherein, in Chemical Formula 2,

X is a single bond, a substituted or unsubstituted C1 to C10 alkylene group, or a substituted or unsubstituted C2 to C10 alkenediyl, and $R_1$ to $R_4$ are independently selected from a hydrogen atom, a C1 to C10 alkyl group, a C3 to C30 cycloalkyl group, a C1 to C10 alkoxy group, a halogen, a C1 to C10 haloalkyl group, C6 to C30 aryl group, and a combination thereof.

14. The electrolyte of claim 12, wherein the sultone compound comprises propane sultone (PS) or 1-propene 1,3-sultone (PST).

15. The electrolyte of claim 12, wherein an amount of the third additive is 0.1 wt % to 5 wt % based on a total amount of the electrolyte for the lithium secondary battery.

16. The electrolyte of claim 1, wherein the electrolyte for the lithium secondary battery further comprises at least one auxiliary additive of vinylethylene carbonate (VC), lithium tetrafluoroborate ($LiBF_4$), and hexane tricyanide (HTCN).

17. A lithium secondary battery, comprising
a negative electrode;
a positive electrode; and
the electrolyte for a lithium secondary battery according to claim 1.

* * * * *

UNITED STATES PATENT AND TRADEMARK OFFICE
CERTIFICATE OF CORRECTION

PATENT NO. : 11,539,075 B2
APPLICATION NO. : 16/629297
DATED : December 27, 2022
INVENTOR(S) : Hyunbong Choi et al.

It is certified that error appears in the above-identified patent and that said Letters Patent is hereby corrected as shown below:

In the Claims

Column 26, Lines 29-30, Claim 1    Delete "(—$C_2H_4$—O—$C_2H_4$—)n" and
Insert --(—C2H4—O—C2H4—)$_n$--

Column 26, Lines 32-33, Claim 2    Delete "(—C2H4—O—C2H4—)n" and
Insert --(—C2H4—O—C2H4—)$_n$--

Signed and Sealed this
Eleventh Day of April, 2023

Katherine Kelly Vidal
*Director of the United States Patent and Trademark Office*